United States Patent
Baptista et al.

(10) Patent No.: US 12,490,731 B2
(45) Date of Patent: Dec. 9, 2025

(54) APPARATUS FOR INDOOR POLLINATION, INDOOR POLLINATION SYSTEM AND METHOD FOR INDOOR POLLINATION

(71) Applicants: Pestroniks Innovations Pte Ltd, Singapore (SG); Cuprina Pollination Pte Ltd, Singapore (SG)

(72) Inventors: Carl Baptista, Singapore (SG); Shankar Seetharam, Singapore (SG); Shyam Gopinath Mysore, Singapore (SG)

(73) Assignees: Pestroniks Innovations Pte Ltd, Singapore (SG); Cuprina Pollination Pte Ltd, Singapore (SG)

( * ) Notice: Subject to any disclaimer, the term of this patent is extended or adjusted under 35 U.S.C. 154(b) by 0 days.

(21) Appl. No.: 18/580,832

(22) PCT Filed: Jul. 8, 2022

(86) PCT No.: PCT/SG2022/050481
§ 371 (c)(1),
(2) Date: Jan. 19, 2024

(87) PCT Pub. No.: WO2023/003508
PCT Pub. Date: Jan. 26, 2023

(65) Prior Publication Data
US 2025/0089627 A1    Mar. 20, 2025

(30) Foreign Application Priority Data
Jul. 19, 2021 (SG) .......................... 10202107909X (51) Int. Cl.
*A01M 1/10* (2006.01)
*A01H 1/02* (2006.01)
*A01M 1/04* (2006.01)

(52) U.S. Cl.
CPC ............. *A01M 1/106* (2013.01); *A01H 1/027* (2021.01); *A01M 1/04* (2013.01)

(58) Field of Classification Search
CPC .......... A01H 1/027; A01M 1/04; A01M 1/06; A01M 1/08; A01M 1/145; A01M 1/106; A01K 67/30; A01K 67/31
See application file for complete search history.

(56) References Cited

U.S. PATENT DOCUMENTS

| 4,075,783 A * | 2/1978 | Burden ................. A01H 1/027 47/1.41 |
| 10,251,384 B2 * | 4/2019 | Barroso ................. A01M 1/04 |

(Continued)

FOREIGN PATENT DOCUMENTS

| CA | 2934312 A1 * | 10/2012 | ............... A01G 7/06 |
| CA | 2836985 A1 | 12/2012 | |

(Continued)

OTHER PUBLICATIONS

International Search Report issued on Feb. 7, 2023, in corresponding International Patent Application No. PCT/SG2022/050481, 3 pages.

(Continued)

*Primary Examiner* — Joshua D Huson
*Assistant Examiner* — Katherine Anne Kloecker
(74) *Attorney, Agent, or Firm* — Maier & Maier, PLLC (57) ABSTRACT

An apparatus for indoor pollination, an indoor pollination system and a method for indoor pollination. The apparatus for indoor pollination includes a first ultraviolet (UV) light source configured to emit pollination enhancing light, an arthropod trap, and a second UV light source housed in the arthropod trap and configured to emit arthropod attracting (Continued)

light. A microprocessor is configured to switch on or off the first and second UV light sources depending on pollination requirements.

22 Claims, 10 Drawing Sheets

(56) References Cited

U.S. PATENT DOCUMENTS

| | | | |
|---|---|---|---|
| 11,060,712 B2* | 7/2021 | Niemiec | F21V 33/0092 |
| 11,102,970 B2* | 8/2021 | Farrington | A01M 1/04 |
| 11,134,667 B2* | 10/2021 | Studer | A01M 1/04 |
| 11,278,018 B2* | 3/2022 | Eom | A01M 1/08 |
| 11,395,464 B2* | 7/2022 | Ajamian | B64U 10/40 |
| 11,576,357 B2* | 2/2023 | Sassmannshaus | A01M 1/023 |
| 2008/0229652 A1* | 9/2008 | Willcox | A01M 1/145 43/113 |
| 2023/0157231 A1* | 5/2023 | Elgrabli | A01B 79/005 47/1.41 |

FOREIGN PATENT DOCUMENTS

| | | | | |
|---|---|---|---|---|
| CN | 101815434 A | | 8/2010 | |
| CN | 103582413 A | | 2/2014 | |
| CN | 107835634 A | | 3/2018 | |
| CN | 209314668 U | | 8/2019 | |
| CN | 110999869 A | * | 4/2020 | |
| JP | 2007000102 A | | 1/2007 | |
| JP | 4701868 B2 | | 6/2011 | |
| JP | 2016054682 A | | 4/2016 | |
| KR | 1020150025689 A | | 3/2015 | |
| NZ | 702278 A | * | 9/2016 | A01M 1/145 |
| SG | 178825 A1 | | 4/2012 | |
| SG | 192980 A1 | | 9/2013 | |
| SG | 193318 A1 | | 10/2013 | |
| SG | 195080 A1 | | 12/2013 | |
| WO | 2009040528 A1 | | 4/2009 | |
| WO | 2011033177 A2 | | 3/2011 | |
| WO | 2011033177 A3 | | 3/2011 | |
| WO | 2011033177 A4 | | 3/2011 | |
| WO | 2012/123628 A1 | | 9/2012 | |
| WO | 2012123627 A1 | | 9/2012 | |
| WO | 2012168539 A1 | | 12/2012 | |
| WO | 2012168539 A4 | | 1/2013 | |
| WO | 2019073443 A1 | | 4/2019 | |

OTHER PUBLICATIONS

Napoleone et al., "How to measure flower ultraviolet reflectance using digital photography", International Association for Vegetation Science, Applied Veg Sci. 2022;25:e12648, Feb. 9, 2022, 7 pages.

Narbona et al., "Painting the green canvas: how pigments produce flower colours", Portland Press Limited, May 29, 2021, DOI:10.1042/bio_2021_137, 7 pages.

Van Der Kooi et al., "How to colour a flower: on the optical principles of flower coloration", The Royal Society Publishing, B 283: 20160429, DOI:10.1098/rspb.2016.0429, 9 pages.

Extended European Search Report issued on Apr. 10, 2025, in corresponding European Application No. 22846340.2, 10 pages.

Office Action issued on Aug. 23, 2025, in corresponding Chinese Application No. 202280060733.7, 24 pages.

Chen et al., "Chemical Attraction of Fig Volatiles to their Pollinating Fig Wasps", Acta Ecologoca Sinica, Dec. 2024, vol. 24, No. 12, 5 pages, with English abstract.

* cited by examiner

APPARATUS FOR INDOOR POLLINATION, INDOOR POLLINATION SYSTEM AND METHOD FOR INDOOR POLLINATION

FIELD

The present invention relates in general to indoor farming and more particularly to an apparatus for indoor pollination, an indoor pollination system and a method for indoor pollination.

BACKGROUND

Food security is a growing concern in light of global developments and climate change.

In traditional agriculture, pollination of flowers is a primary means of generating fruit and consequently seeds for fruiting crops. The most efficient method of pollination is performed by arthropods such as, for example, insects.

In the case of outdoor farming, pollination is largely dependent on the natural ecosystem of an area.

However, in the case of indoor farming, arthropods are typically not present to facilitate natural pollination as indoor growth environments are usually enclosed to prevent ingress of pests and pathogens that could adversely affect plant growth. Consequently, indoor farming is usually restricted to farming of leafy vegetables as such crops do not require pollination. In limited instances, humans, drones or robots are used to pollinate flowers in an indoor setting. However, the use of non-arthropod methods is less cost effective and efficient than arthropod pollination methods.

There is therefore a need for an apparatus for indoor pollination, an indoor pollination system and a method for indoor pollination that facilitates cultivation of fruiting crops in an indoor environment.

SUMMARY

Accordingly, in a first aspect, the present invention provides an apparatus for indoor pollination including a first ultraviolet (UV) light source configured to emit pollination enhancing light, an arthropod trap, and a second UV light source housed in the arthropod trap and configured to emit arthropod attracting light. A microprocessor is configured to switch on or off the first and second UV light sources depending on pollination requirements.

In a second aspect, the present invention provides an indoor pollination system including an enclosure, a plurality of grow lights within the enclosure, and the apparatus for indoor pollination according to the first aspect provided within the enclosure.

In a third aspect, the present invention provides a method for indoor pollination. The method includes switching on a plurality of first ultraviolet (UV) light-emitting diodes (LEDs) configured to emit pollination enhancing light, switching off the first UV LEDs, and switching on a plurality of second UV LEDs housed in an arthropod trap, the second UV LEDs being configured to emit arthropod attracting light for arthropod attraction.

Other aspects and advantages of the invention will become apparent from the following detailed description, taken in conjunction with the accompanying drawings, illustrating by way of example the principles of the invention.

DETAILED DESCRIPTION

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the scope of the invention.

The term "pollination enhancing light" as used herein refers to wavelengths of ultraviolet (UV) light that are reflected by petals of flowers and that attract arthropod pollinators.

The term "arthropod attracting light" as used herein refers to wavelengths of UV light that generate a positive phototaxis response in arthropods, drawing the arthropods to the light source.

Figure 1:
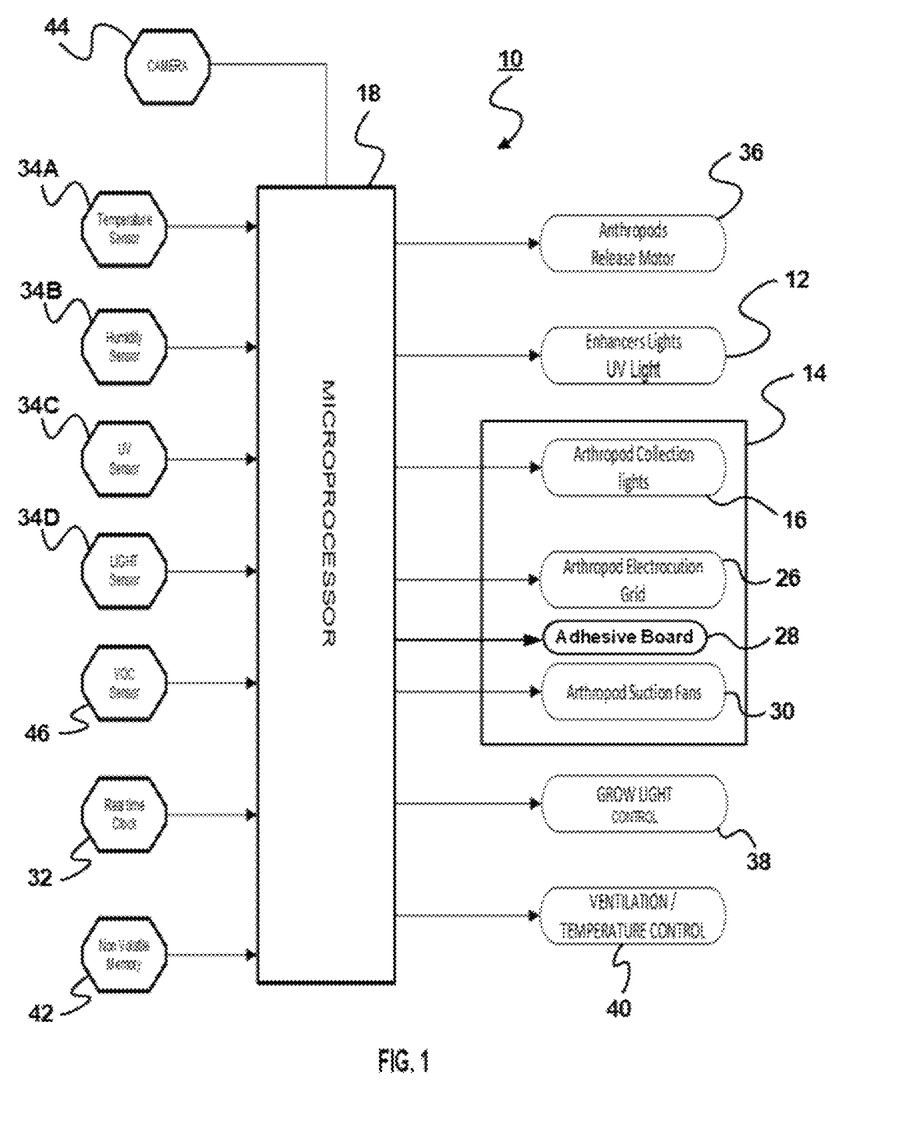
FIG. 1 is a schematic diagram illustrating an apparatus for indoor pollination in accordance with an embodiment of the present invention.

Referring now to FIG. 1, an apparatus 10 for indoor pollination is shown. The apparatus 10 for indoor pollination includes a first ultraviolet (UV) light source 12 configured to emit pollination enhancing light, an arthropod trap 14, a second UV light source 16 housed in the arthropod trap 14 and configured to emit arthropod attracting light, and a microprocessor 18 configured to switch on or off the first and second UV light sources 12 and 16 depending on pollination requirements.

Advantageously, the apparatus 10 for indoor pollination assists the pollination of flowers grown in indoor agriculture environments and uses UV lights 12 to illuminate flowers for arthropods to find. The UV lights 12 are used to illuminate flowers for more efficient detection of flowers for pollination (flower illumination) by arthropods.

The UV lights 12 and 16 in the apparatus 10 for indoor pollination are used for two (2) distinct purposes: initiation and termination of flower seeking and pollination activities of indoor crops by arthropods, and removal of arthropods once pollination activities are completed.

Figure 2:
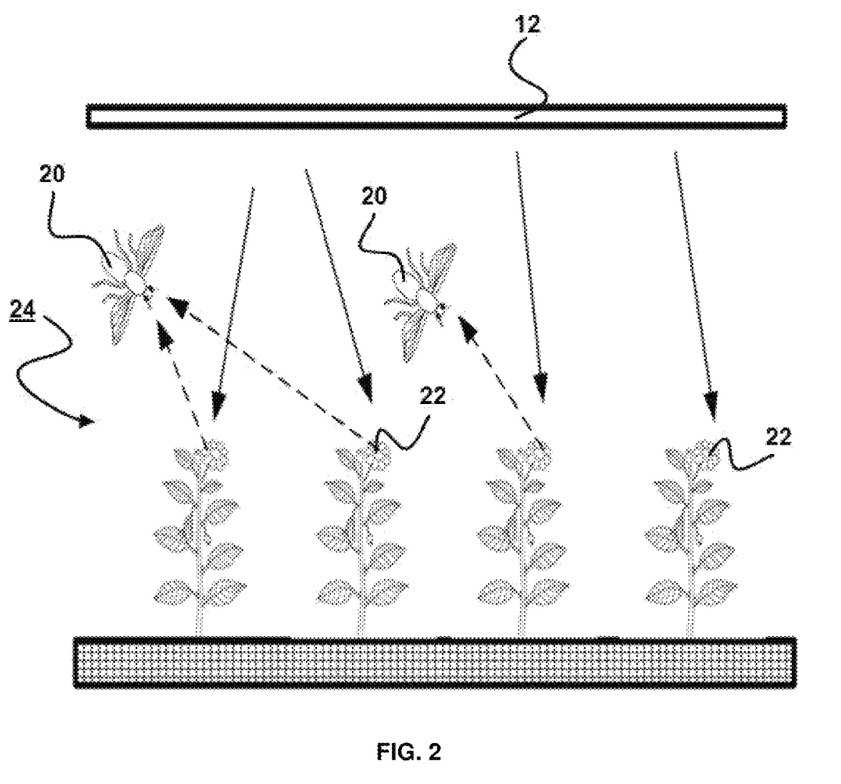
FIG. 2 is a schematic diagram illustrating operation of a first UV light source of the apparatus for indoor pollination of FIG. 1 on arthropods in an enclosed space.

Referring now to FIG. 2, operation of the first UV light source or visual flower enhancer lights 12 on arthropods 20 in an enclosed space is shown. The first UV light source or visual flower enhancers 12 within the enclosed space may be specific UV light-emitting diodes (LEDs) that emit wavelengths of light that provide the arthropod pollinators 20 with visual navigation to detect flowers 22 of an indoor crop 24 ready for pollination through generation of a positive phototaxis response in the arthropods 20 to stimulate movement of the arthropods 20 towards the flowers 22. Accordingly, the first UV light source 12 may include a plurality of first UV light-emitting diodes (LEDs). The first UV LEDs may emit specific wavelengths of UV light that cause the flowers 22 of the indoor crop 24 to glow, providing a visual cue to the arthropods 20 within the enclosed space. More particularly, the visual flower enhancer lights emit specific UV wavelengths of light that cause a target species of the flowers 22 to absorb and re-emit the UV light at a wavelength of light that is between about 400 nanometres (nm) and about 480 nm on flower surfaces. The wavelengths of ultraviolet (UV) light emitted by the first UV light source 12 are specifically configured to match spectral absorbance of petals and/or reproductive portions of the flowers 22 before or during anthesis, thereby illuminating the flowers 22 that are ready for pollination. The UV wavelengths are absorbed by external surface cells of the flowers 22 and re-emitted at wavelengths of light that are recognizable by the arthropods 20. The wavelength ranges re-emitted by the flowers 22 are specific to match rhodopsin photo pigment absorption wavelengths found in compound eyes of the arthropods 20 employed. Accordingly, the first UV LEDs may be configured to emit the pollination enhancing light at a wavelength of between about 280 nanometres (nm) and about 400 nm. In one or more embodiments, the wavelength of the pollination enhancing light emitted by the first UV LEDs may be between about 315 nm and about 400 nm.

The arthropods 20 may be from one or more insect species such as, for example, hymenoptera (solitary or eusocial), lepidoptera, diptera and coleoptera.

Figure 3:
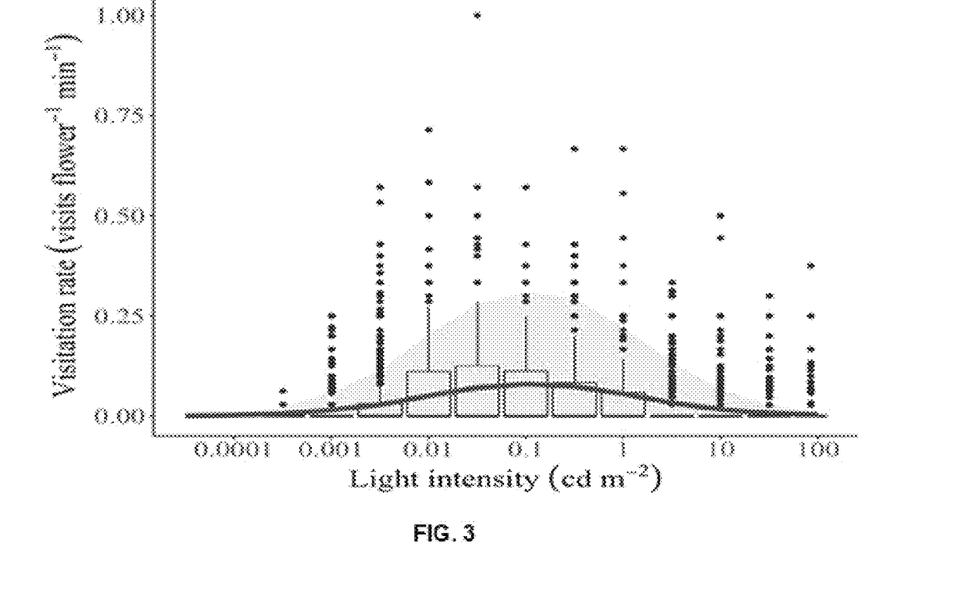
FIG. 3 is a graph of visitation rate by arthropods against light intensity.

Referring now to FIG. 3, a graph of visitation rate by arthropods against light intensity is shown. Ultraviolet A (UVA) lights or visual flower enhancers 12 may be strategically placed within the pollinating arena to help the arthropods 20 to find the flowers 22. The visual flower enhancers 12 may be angled strategically to maximize coverage of all the flowers 22 to generate maximum positive phototaxis response in the arthropod pollinators 20 within the enclosed space. Because the flowers 22 on plants extend out at different angles and LEDs release light in a cone shape with a specific beam angle/field angle, a single row of LEDs may not achieve sufficient beam angle to illuminate flowers in indoor pollination environments. Several rows or staggered lights in two (2) or more rows may create sufficient beam angles/field angles to illuminate flower petals that face different angles. Accordingly, the first UV LEDs may be arranged in one or more of a plurality of rows and a staggered arrangement. The UV lights may be permanently placed in situ and activated only when a pollination process is initiated. Alternatively, the UV lights may be an integral part of the enclosed space and may be activated once installed at a designated location.

Figure 4:
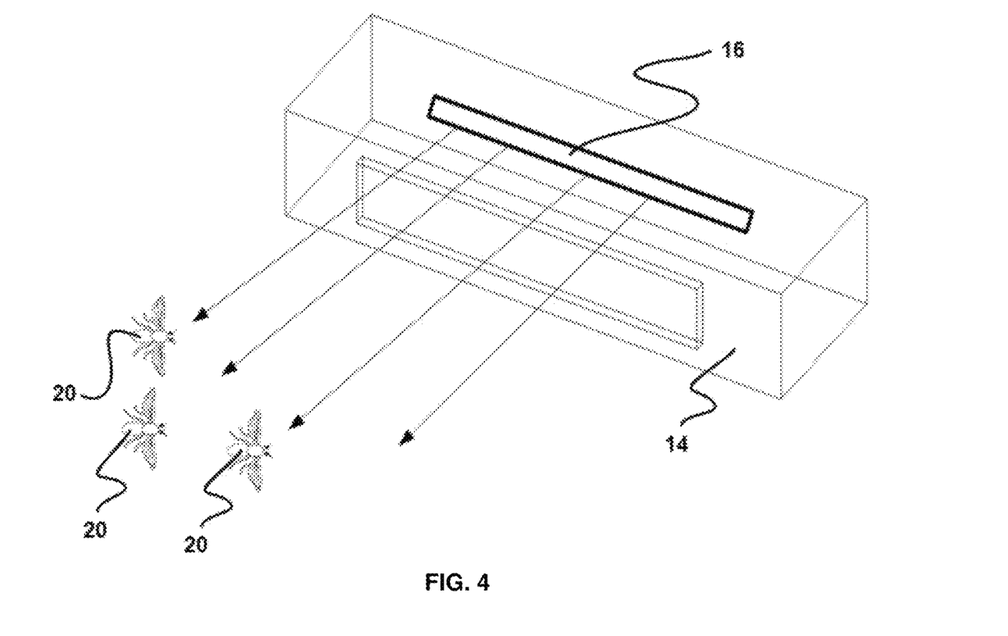
FIG. 4 is a schematic diagram illustrating operation of a second UV light source of the apparatus for indoor pollination of FIG. 1 on the arthropods in the enclosed space.

Referring now to FIG. 4, operation of the second UV light source or arthropod collection lights 16 on the arthropods 20 in the enclosed space is shown. To remove the arthropod pollinators 20 from the enclosed space, special UVA light traps 14 may be used to remove and eliminate the arthropods 20. Following cessation of pollination activities, the arthropod pollinators 20 may then be collected after pollination is completed through another positive phototaxis response. The arthropod pollinators 20 may be collected by activation of the second UV light source or arthropod collection lights 16 in one or more of the UV insect light traps 14 placed strategically within the indoor crop cultivation area. Activation of the second UV light source or arthropod collection lights 16 triggers or generates a positive phototaxis response in the arthropod pollinators 20, attracting the arthropod pollinators 20 towards the arthropod trap 14, and thereby initiating collection of the arthropod pollinators 20. The second UV light source 16 may include a plurality of second UV LEDs. The second UV light source or arthropod collection lights 16 may be placed strategically away from the pollinated flowers 22 to attract the arthropods 20 permanently away. Accordingly, the UV LED trap 14 may be used to attract and remove the arthropods 20 when pollination is completed.

Apart from being used for recapture, the second UV light source 16 may also be used to capture insect pests that may inadvertently be present within the indoor farm. More particularly, when removal of the arthropods 20 from the enclosed space is completed or not required, the second UV light source may be repurposed for pest control and/or pest detection and surveillance. This is because the wavelengths of the UV light emitted by the second UV light source 16 also correspond strongly to the rhodopsin pigments in the eyes of insect pests that occasionally and inadvertently enter the indoor farm, causing a strong positive phototaxis response to the wavelengths of UV light emitted by the second UV light source 16. The stray pests that are caught may be analysed and recorded as part of pest management programme for the indoor farm.

Referring again to FIG. 1, the arthropod trap 14 may include one or more of an electrocution grid 26, an adhesive board 28 and a suction device 30. More particularly, the UV insect light trap 14 may be equipped with electrocution grids 26, adhesive boards 28 and/or suction fans 30 to suction the arthropods 20 into a collection chamber. After being attracted into the arthropod trap 14 by the second UV light source or arthropod collection lights 16, the arthropods 20 are then collected and/or killed by the electrocution grid 26 and/or the adhesive glue board 28 or by sucking through a fan 30 into a collection area.

The apparatus 10 for indoor pollination may include a real-time clock 32 coupled to the microprocessor 18, the real-time clock 32 being configured to regulate switching of the first UV light source 12 on and off by the microprocessor 18.

As can be seen from FIG. 1, the apparatus 10 for indoor pollination may also include a plurality of sensors 34 coupled to the microprocessor 18, the sensors 34 being configured to measure one or more of temperature, humidity and light intensity and to feed one or more of a temperature measurement, a humidity measurement and a light intensity measurement back to the microprocessor 18. The sensors 34 connected to the microprocessor 18 serve to measure environmental conditions within the enclosed space.

Temperature, humidity and UV light intensity influence and affect arthropod visitation rates and likelihood of successful pollination. Release of the arthropods 20 is timed to coincide with maximum activity of the arthropods 20 and ideal conditions of temperature, humidity and ambient and UV lighting in the pollination area to ensure maximum visitation of the flowers 22 by the arthropods 20. The temperature sensor 34A and the humidity sensor 34B provide feedback on an optimal time to release the arthropods 20 into the pollination area to ensure the arthropods 20 are most active when released. As cessation of pollination activity is governed mainly by a fast decline in light intensity, the UV or light sensor 34C or 34D is used to measure light intensity in the pollination area. Since ambient light influences visitation rates of the pollinator arthropods 20 to the flowers 22, it is important to control light intensity through the microprocessor 18 in order to maximize visitations to the crop flowers 22 to ensure maximum pollination occurs. There are minimum threshold conditions for temperature, relative humidity and light intensity for initiation of pollination activity. Based on feedback from the temperature sensor 34A, the humidity sensor 34B and the light sensor 34C or 34D, threshold values may be set for a particular type of arthropods used for a specific crop. Information from the sensors 34 is processed by the microprocessor 18 and when conditions are favourable, the first UV light source 12 is switched on and release of the arthropods 22 is activated accordingly.

Based on feedback from a combination of the sensors 34, release of the arthropods 20 may be initiated using an arthropod release motor 36 coupled to the microprocessor 18.

When combined with the light or UV sensors 34C or 34D, ambient light may be adjusted through a grow light control 38 to ensure maximum flower visitation occurs for maximum pollination.

The apparatus 10 for indoor pollination may further include a ventilation and temperature control system 40 coupled to the microprocessor 18 and configured to adjust one or more environmental conditions based on one or more of the temperature measurement and the humidity measurement received by the microprocessor 18 from the sensors 34. The microprocessor 18 may activate the ventilation and temperature control system 40 to maintain the pollination area in an optimal condition for pollination visitations to the flowers 22 by specific arthropods 20 for a particular cultivated crop.

Figure 5:
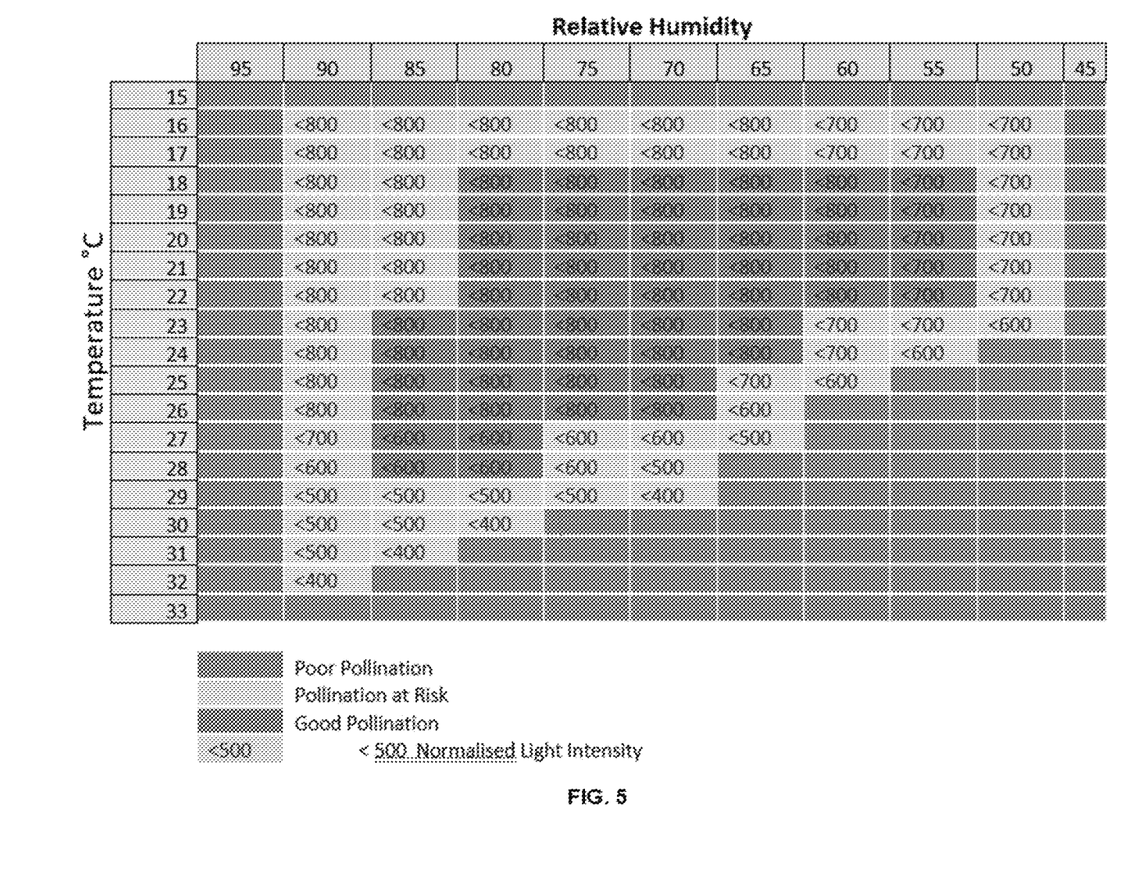
FIG. 5 is an exemplary table of optimum pollination conditions for a specific type of arthropod and a specific crop.

Referring now to FIG. 5, an exemplary table of optimal pollination conditions for a specific type of arthropod 20 and a specific cultivated crop 24 is shown. Depending on the species of arthropod used for indoor pollination of specific crops, the temperature of use ranges between about 16 degrees Celsius (C) and about 40° C., with optimum temperature of pollination occurring between about 18° C. and about 27° C. The pollination temperature should also align with optimal growth temperatures of the target crops and should not cause thermal shock to the plants. Environmental conditions best suited for indoor pollination include a relative humidity of between about 45% and about 67% and a light intensity between about 4700 lux (lx) and about 7400 (lx), but pollination may also be performed at a relative humidity and light intensities outside this range subject to optimal conditions required for specific crops. For example, maximum pollination activity of the arthropod, *Megachile lanata*, was observed between 1200 h and 1400 h when air temperatures ranged between about 29.5° C. and about 38° C., relative humidity ranged between about 45.0% and about 67% and light intensity ranged between about 4700 lx and about 7400 lx.

Using feedback from the temperature sensor 34A and the light sensor 34C or 34D, pollination activity may be terminated by dimming of the first UV light source 12 at a right temperature.

Referring again to FIG. 1, data on timing of day, temperature, humidity and light intensity for release of the arthropods 20 may be stored in a non-volatile memory 42 coupled to the microprocessor 18. The memory 42 may also retain data on different parameters of light intensity, temperature, humidity and intensity of UV lights required during the hours of pollination activity. The data may be cyclic or sequential in nature and may be specific to arthropod species and crop type.

The apparatus 10 for indoor pollination may still further include a plurality of cameras 44 coupled to the microprocessor 18, the cameras 44 being configured to allow real-time viewing. The cameras 44 connected to a microprocessor 18 may allow humans or artificial intelligence (AI) to observe within the enclosed space. The AI may perform automated functions that do not require human intervention. The cameras 44 may include thermal imagers to provide flower surface temperatures and/or spectrum imagers or filters that only allow images in UV or particular wavelengths relevant to flower illumination to be observable. Advantageously, the latter allows farmers and AI to monitor if the flowers 22 are ready for pollination. The cameras 44 allow for real-time viewing of a pollination cycle and also monitoring of arthropod activity including general activity, pollination activity, release and successful recapture. The sensors 34 and the cameras 44 may be used in tandem to provide information to farmers or AI to determine optimal conditions for pollination, when the flowers 22 are ready for pollination, an optimal moment to release the arthropods 20, activity rates of the arthropods 20 preforming pollination, when the flowers 22 are fully pollinated and no longer need the arthropods 20, when the first and second UV light sources 12 and 16 are switched from pollination mode to recapture mode, and arthropod activity after the recapture mode is activated to determine if the recapture mode is successful.

The apparatus 10 for indoor pollination may also include a volatile organic compound (VOC) sensor 46 coupled to the microprocessor 18, the microprocessor 18 being configured to start or end a pollination cycle based on a volatile organic compound (VOC) level detected by the VOC sensor 46. The VOC sensor 46 may be used to detect specific organic compounds or an array of organic compounds. In farming, a natural organic compound like ethylene, a gaseous plant hormone, triggers blooming of flowers and signals a need for imminent pollination. Examples of detectable VOCs include aldehydes, alcohols, ketones, esters, ethanol, linalool, lilac alcohol, acetaldehyde, (E)-2-hexenal, benzaldehyde and dimethyl sulphide. When the VOC sensor 46 detects a VOC level above a predetermined threshold value, this signals a need for pollination. Correspondingly, when the VOC sensor 46 measures a decline in the VOC level below the predetermined threshold value, the pollination cycle may be put to an end.

The apparatus 10 for indoor pollination may be automated and may be employed for indoor farming or crop cultivation in the absence of natural sunlight. In use, the apparatus 10 for indoor pollination may be placed in a room for plants to be pollinated. The apparatus 10 for indoor pollination may be scaled up for purpose-built facilities or be temporarily clipped onto grow racks used in indoor farming facilities.

Figure 6A:
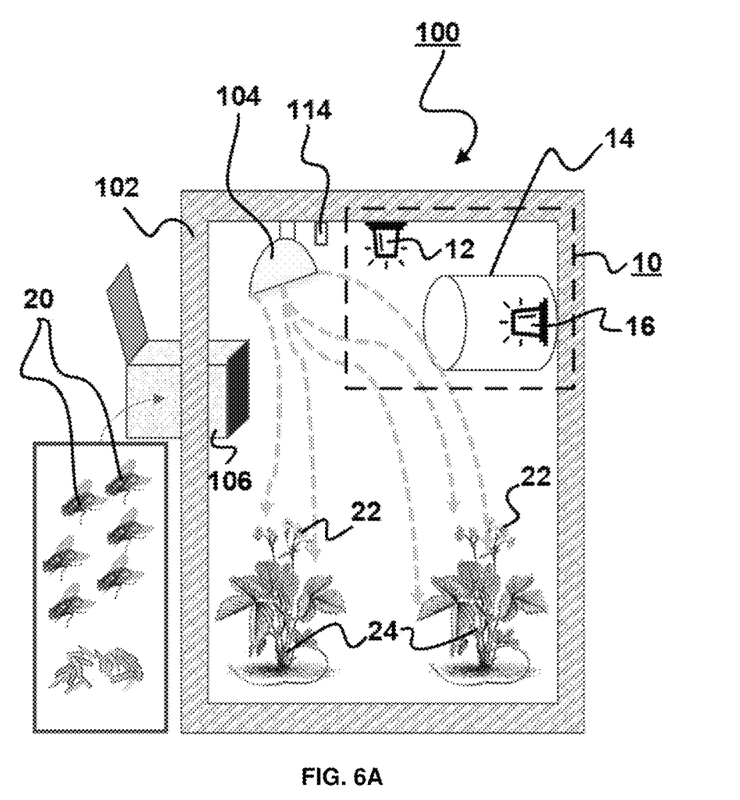
FIG. 6A is a schematic diagram illustrating an indoor pollination system in accordance with an embodiment of the present invention.
Figure 6B:
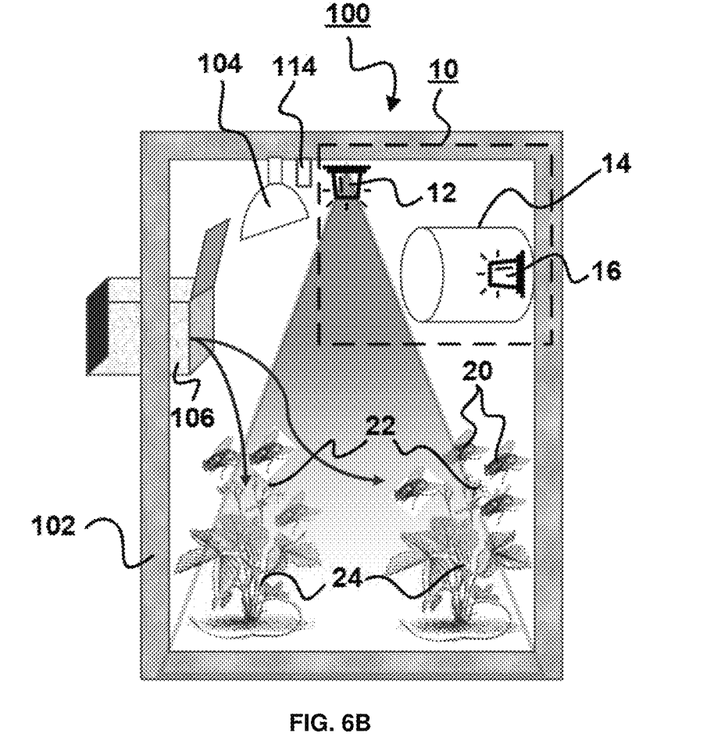
FIG. 6B is a schematic diagram illustrating an indoor pollination system in accordance with an embodiment of the present invention.
Figure 6C:
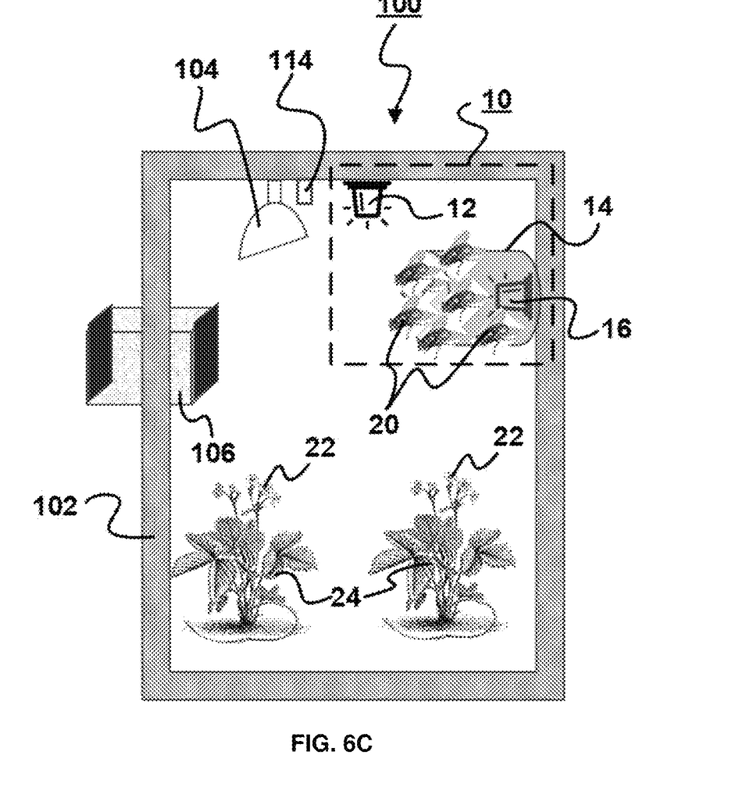
FIG. 6C is a schematic diagram illustrating an indoor pollination system in accordance with an embodiment of the present invention.

Referring now to FIGS. 6A through 6C, an indoor pollination system 100 is shown. In FIG. 6A, the flowers 22 are shown as being ready for pollination and the arthropods 20 are shown being placed on standby for release. As can be seen from FIG. 6A, only pupae and adults of the arthropods 20 are placed into a holding area prior to release, and never larvae stages of the arthropods 20. In FIG. 6B, the arthropods 20 are shown as having been released and the flowers 22 are shown as being illuminated to direct the arthropods 20 to the flowers 22. In FIG. 6C, the first UV light source 12 is shown as being switched off and the second UV light source 16 is shown as being switched on. The indoor pollination system 100 includes an enclosure 102, a plurality of grow lights 104 within the enclosure 102 and the apparatus 10 for indoor pollination provided within the enclosure 102.

The enclosure 102 houses an enclosed space or pollination arena in which the automated pollination process for indoor crop cultivation may be performed in situ, the arthropods 20 being released into the enclosed space. The pollination arena may be on a single shelf or multiple shelves within a rack or within a room with multiple racks. The enclosure 102 serves to keep the released arthropods 20 confined within a designed area and contains no gaps large enough for the arthropods 20 to escape from the pollination arena during a pollination cycle.

The first UV light source 12 of the apparatus 10 for indoor pollination may be strategically placed above or around the indoor crops 24 and the second UV light source 16 of the apparatus 10 for indoor pollination may be strategically placed away from the indoor crops 24. The second UV light source 16 may also be strategically placed away from the first UV light source 12 within the enclosed area to strategically illuminate non-flowering areas within the enclosure post-pollination. As can be seen from FIG. 6C, the UV wavelengths emitted by the second UV light source 16 may be specifically configured to stimulate a positive phototaxis movement of the pollinating arthropods 20 within the enclosed area towards an area of the enclosure away from the flowers 22, where the arthropods 20 may be collected. The first and second UV light sources 12 and 16 are controlled through the microprocessor 18 with associated sensors 34 to activate and deactivate the first and second UV light sources 12 and 16 accordingly to ensure optimized pollination.

In the pollination arena, the first and second UV light sources 12 and 16 are used in addition to the standard grow lights 104 associated with photosynthesis and the first and second UV light sources 12 and 16 may be switched on and off for pollination cycles during photosynthetic times or during a dark cycle (non-photosynthetic times) depending on the optimal activity times of the arthropods 20 chosen for the pollination activity.

Figure 7:
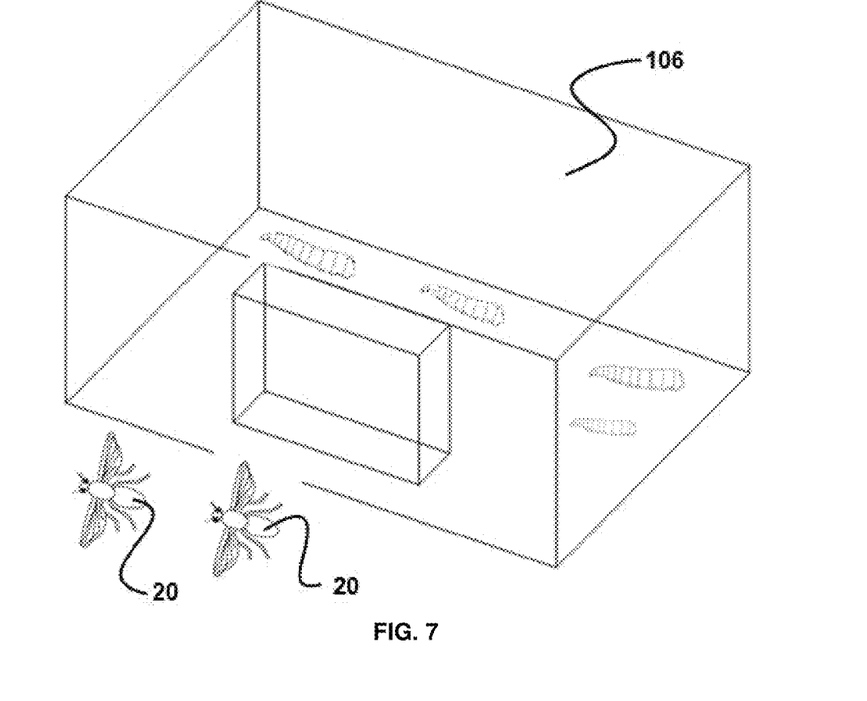
FIG. 7 is a schematic diagram illustrating an exemplary embodiment of a housing provided in an enclosure of the indoor pollination system of FIGS. 6A through 6C.

Referring now to FIG. 7, the indoor pollination system 100 may include a housing 106 provided in the enclosure 102, the housing 106 being configured to hold a plurality of arthropods 20.

The arthropods 20 for indoor crop cultivation may be non-bee arthropod pollinators that are not of Apis spp. honeybee genus, other honeybee species, and solitary or native bees. The non-bee arthropod pollinators 20 may be specific flies, commonly known as blow flies, bottle flies, hover flies or drone flies, for example, *Lucilia* spp. such as, for example, *Lucilia cuprina* and *Lucilia sericata*.

The arthropod pollinators 20 may be supplied to the housing 106 during a pupal stage or any dormant stage of an arthropod life cycle. Advantageously, by introducing pupae of arthropod pollinators or dormant stage arthropods within a fully enclosed area, the arthropods 20 for indoor crop cultivation cannot escape from the enclosed area when hatched into adults, thereby helping regulate the number of arthropod pollinators 20 in the pollination arena. Accordingly, the housing 106 may include an arthropod breeding chamber for breeding of the non-bee arthropod pollinators 20 before releasing the arthropod pollinators 20 into the indoor crop cultivation area and generating a positive phototaxis response from the arthropod pollinators 20 to perform pollination. The arthropods 20 may be placed in the arthropod breeding chamber 106 during later stages of the pupae stage when adult emergence is imminent. Breeding of the arthropod pollinators 20 may include management of all stages of the life cycle of the arthropod pollinators 20. The breeding of the arthropod pollinators 20 may be conducted using sterilized and disinfected conditions and feeds to minimize microbial growth on the arthropod pollinators 20. The breeding may be conducted in specific breeding areas resembling cages. The arthropods 20 may be fed with proteins, carbohydrates and trace elements regularly to ensure proliferation of healthy arthropod pollinators 20. The feed medium may be in liquid, gel, slurry or powdered form and may be specifically tailored to nutritional requirements of the arthropod pollinators 20 being reared. In the indoor crop cultivation area, the pupae of the arthropod pollinators 20 may hatch into adults naturally or artificially through manipulation of environmental conditions such as, for example, temperature and humidity. The adult stage may be synchronized with maximum flowering stages of the crops 24 so as to provide maximum activity when hatched.

The number of arthropod pollinators 20 required may be determined by the requirements of the indoor crop cultivation area. The number of arthropods 20 to be released into the pollination arena 102 may be determined by a farmer based on crop species and the number of flowers 22 requiring pollination during a single pollination cycle.

Figure 8:
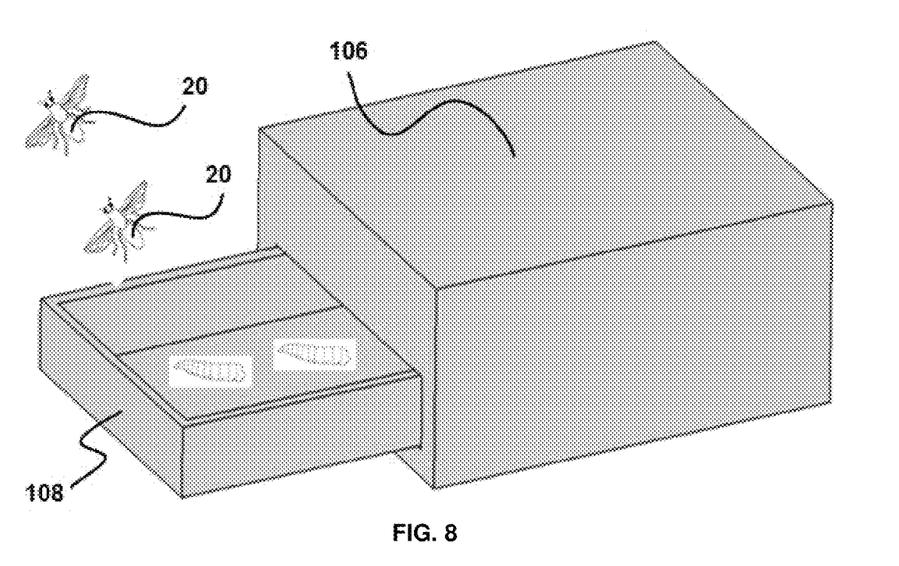
FIG. 8 is a schematic diagram illustrating another exemplary embodiment of the housing of the indoor pollination system of FIGS. 6A through 6C.

Referring now to FIG. 8, another embodiment of the housing 106 is shown. In the embodiment shown, the housing 106 is provided in an opening of the enclosure 102 and includes a drawer 108, the drawer 108 being arranged to receive a plurality of arthropods 20 when in a first position and to release the arthropods 20 when in a second position. More particularly, the drawer 108 may open out into an external face of the pollination arena 102 to receive pupae and/or adults of the arthropods 20 when in the first position. When the drawer 108 is closed or in the second position, the pupae and/or adults of the arthropods 20 are immediately within the pollination arena 102. The drawer 108 provides a manual way of introducing the arthropods 20 into the pollination arena 102 from outside of the pollination arena 102 and completely seals the arthropods 20 within once the arthropods 20 are introduced into the pollination arena.

Figure 9:
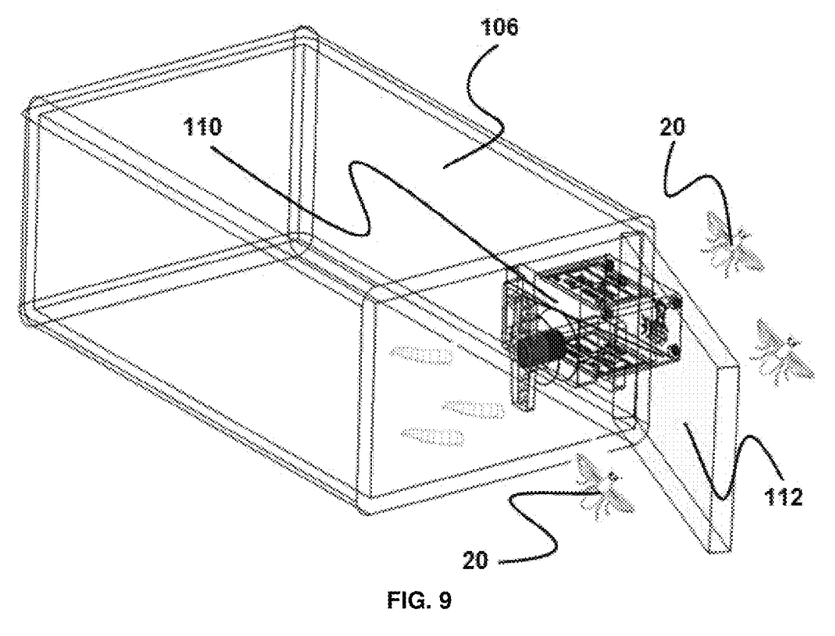
FIG. 9 is a schematic diagram illustrating yet another exemplary embodiment of the housing of the indoor pollination system of FIGS. 6A through 6C.

Referring now to FIG. 9, yet another embodiment of the housing 106 is shown. In the embodiment shown, a release motor 110 is coupled to the housing 106, the release motor being configured to open a door 112 of the housing 106 to release the arthropods 20 in response to a signal from the microprocessor 18. Provision of the release motor 110 allows remote automation of the release of the arthropod pollinators 20 into the pollination arena 102 from outside the pollination arena 102, for example, following emergence of the adult arthropod pollinators 20 from the pupae stage. Advantageously, automated remote releasing of the arthropod pollinators 20 into the pollination arena 102 reduces probability of the arthropod pollinators 20 escaping from the pollination arena 102 and also serves to reduce direct interaction between the arthropod pollinators 102 and crop cultivators or farmers.

The release of the arthropods 20 into the pollination arena 102 may be controlled through the microprocessor 18 and the associated sensors 34. The adult stage of the arthropods 20 may be synchronized with maximum flowering stages of the crops 24 so as to provide maximum activity of the arthropods 20 when automatically released by the microprocessor 18 into the pollination area 102 based on the duration to adult stage. Based on inputs from the sensors 34 and age of the pupae when put into the housing or arthropod release unit 106, the microprocessor 18 may accordingly operate the release motor 110 to ensure the emerged adult arthropods 20 are free to fly out and carry out pollination. Furthermore, the microprocessor 18 may manage the release motor 110 to automatically release batches of arthropods 20 into the pollination area 22 in a cyclical or sequential manner with respect to time or other sensor parameters to ensure maximum pollination. Accordingly, the release motor 110 may be configured to release the arthropods 20 in a cyclical or sequential manner.

Referring again to FIG. 8, the release of arthropods 20 from the drawer 108 may similarly be controlled through an arthropod release motor configured to operate a release mechanism. More particularly, after the pupae of the arthropods 20 are placed from an external face into the drawer 108 where it is covered and locked into place, the drawer 108 is then closed and the covered and locked pupae are now within the pollination area 102. The locked cover within the drawer 108 may be remotely opened by the microprocessor 18 to release adults that have emerged from the pupae directly into the pollination arena 102 based on inputs received from the sensors 34.

Referring again to FIGS. 6A through 6C, the indoor pollination system 100 may also include a sprayer 114 within the enclosure 102, the sprayer being configured to spray an olfactory enhancer onto crops 24. Prior to introduction of the arthropods 20 into the pollination arena 102, an indoor farmer may choose to treat the flowers 22 with a liquid, gel or powder that serves as an olfactory enhancer to released arthropods 20. Olfactory enhancers may be sprayed onto the plants 24 and/or flowers 22 as microscopic droplets prior to the release of the arthropod pollinators 20. The olfactory enhancer serves to attract arthropods 20 to the flowers 22 and to encourage the arthropods 20 to extend the duration of their flower visitations during a pollination cycle. To generate a first positive taxis response to perform pollination, olfactory enhancers may be sprayed onto the flowers 22 prior to introduction of the arthropod pollinators 20 as pupae. This may be in addition to using visual flower enhancers 12 that are strategically placed within the indoor crop cultivation area 102. Flowers 22 attract arthropods 20 from longer distances by scents and arthropods 20 move up the concentration gradients to find the flowers 22. Once within visual range of the flowers 22, the visual attraction completes landing of the arthropods 20 onto flower petals to initiate collection of nectar resources within the flower 22 and then inadvertent pollination occurs whilst doing so.

The indoor pollination system 100 may be employed in such a manner that the first and second UV light sources 12 and 16 are not used together and serve to herd the arthropods 20 in a positive phototaxis movement to either conduct pollination activity or be removed from flower areas when sufficient pollination has occurred.

Having described various elements of the apparatus 10 for indoor pollination and the indoor pollination system 100, a method 150 for indoor pollination will now be described below with reference to FIG. 10.

Figure 10:
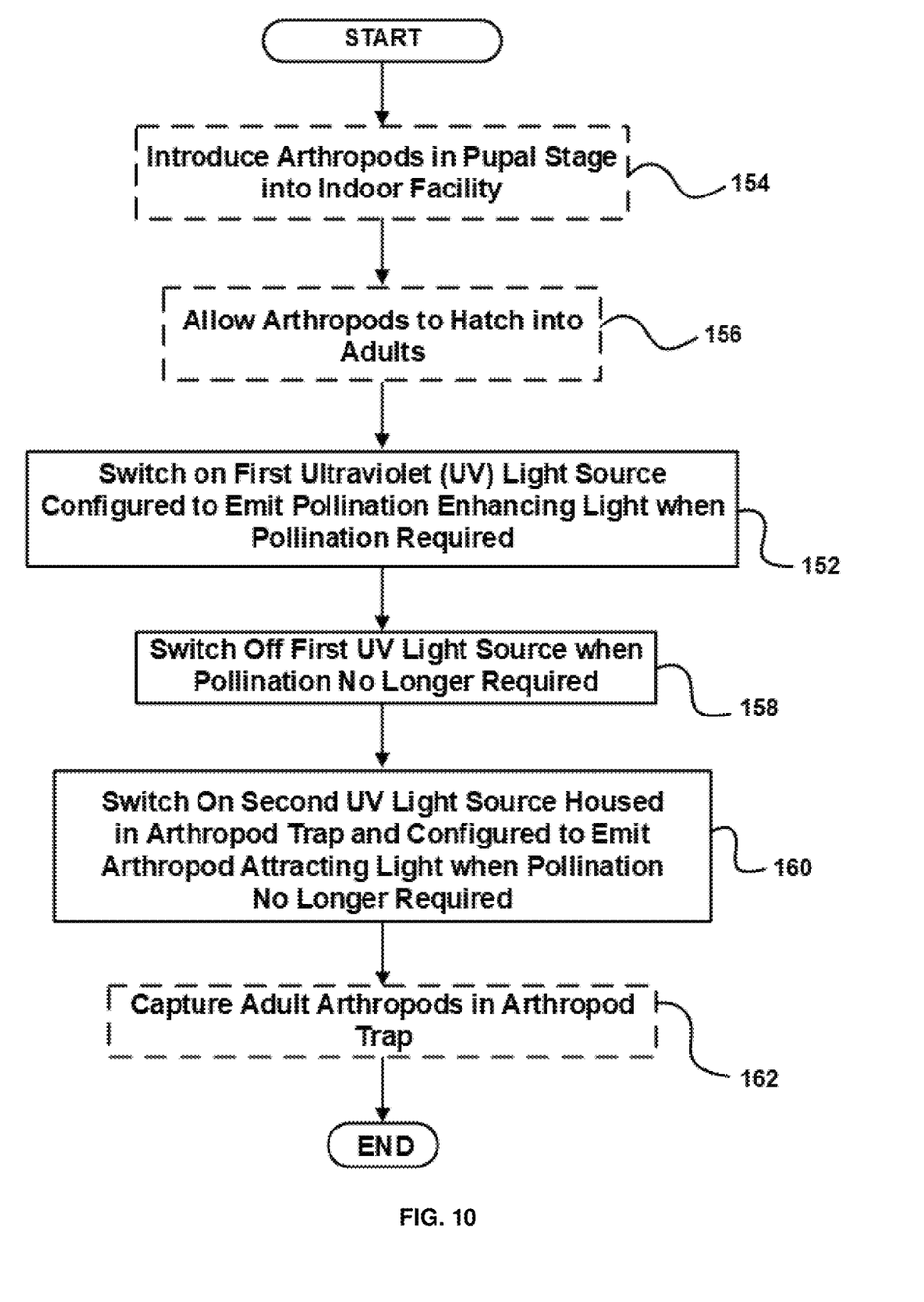
FIG. 10 is a schematic flow diagram illustrating a method for indoor pollination in accordance with an embodiment of the present invention.

Referring now to FIG. 10, the method 150 for indoor pollination is shown. The method 150 begins at step 152 by switching on a first ultraviolet (UV) light source 12 configured to emit pollination enhancing light when pollination is required. More particularly, when an indoor farmer determines that crops 24 require pollination, the crops or plants 24 are first placed within the enclosed pollination arena 102. The visual flower enhancer lights or first UV LEDs 12 may be switched on once the indoor crops 24 are placed in the pollination arena 102.

Before switching on the first UV light source 12, pupal stage arthropods 20 may be released into the pollination arena 102 and allowed to hatch into adults. Accordingly, in one or more embodiments, a plurality of arthropods 20 in pupal stage may be introduced at step 154 into an indoor facility 102 and the arthropods 20 may be allowed at step 156 to hatch into adults before switching on the first UV light source 12 at step 152. The arthropods 20 may be placed into the pollination arena 102 and sealed within the enclosed space 102 requiring pollination. In an alternative embodiment, the automated pollination system may be installed in the indoor cultivation area during the pollination period.

Once the arthropods 20 begin pollination, farmers may remotely observe the pollination activity from the cameras 44 placed within the pollination arena 102 and decide on an optimal point at which to cease pollination activities. The pollination exercise is completed when the flowers 22 are deemed to be adequately pollinated by the arthropod pollinators 20 or after a pre-determined duration of time, after which pollination may then be terminated. Pollination termination may be initiated by deactivation of the olfactory enhancers and the visual flower enhancers or first UV LEDs 12 to reduce the pollination activities of the arthropod pollinators 20 within the pollination arena 102. Once the growers are satisfied that pollination is completed, flower illumination is no longer required and the UVA lights 12 are switched off so that flower detection by the arthropods 20 becomes less efficient in order to cease pollination activities. Accordingly, at step 158, the first UV light source 12 is switched off when pollination is no longer required. When the visual flower enhancer lights or first UV LEDs 12 are switched off, the arthropods 20 within the pollination arena 102 become unable to seek the flowers 22 based on visual cues.

At step 160, a second UV light source 16 housed in an arthropod trap 14 is switched on when pollination is no longer required. The second UV light source 16 is configured to emit arthropod attracting light for arthropod attraction. The arthropod collection lights or second UV light source 16 may be switched on either immediately or at a predetermined interval after the visual flower enhancers or first UV light source 12 is switched off.

At step 162, the adult arthropods 20 may be captured in the arthropod trap 14 after switching on the second UV light source 16. In this manner, the arthropods 20 in adult stage may be captured and terminated after switching off the first UV LEDs 12 upon completion of pollination activities.

The pollinated plants may then be allowed to come to fruit and then harvested as a crop 24 when deemed ready by growers.

As is evident from the foregoing discussion, the present invention provides an apparatus for indoor pollination, an indoor pollination system and a method for indoor pollination that facilitates cultivation of fruiting crops in an indoor environment. Advantageously, the method for indoor pollination of the present invention provides an efficient indoor pollination method utilizing arthropods and UV lights to pollinate indoor flowers with the arthropods being removed on demand at a predetermined time. The UV lights help the arthropods find flowers. Pollination activities may be stopped once the flowers are pollinated and the pollinators may be removed once they have completed their task. Advantageously, the present invention through the provision of efficient indoor pollination increases the variety of crops that may be efficiently grown indoors, produces better fruit due to complete pollination of flowers and increases yields. Further advantageously, the present invention facilitates performance of efficient indoor pollination on demand or at regular intervals as determined by flowering cycles of crops. By using UV light to herd arthropods to and away from flowers, the present invention increases pollination efficiency, whilst reducing flower drop, thereby increasing eventual fruit output. The present invention also provides all indoor growers an opportunity to grow alternative crops previously deemed impossible or not economically viable due to lack of efficient pollination by providing the growers with on-demand arthropods to be utilized as pollinators. Further advantageously, the present invention is organic in nature as no chemicals or pesticides are involved. Although both manual and automatic operation are possible, the present invention may be automated as a programmable feature. Embodiments of the present invention may include a means of releasing specific arthropods and a means of attracting or capturing released arthropods, all within an enclosure.

While preferred embodiments of the invention have been described, it will be clear that the invention is not limited to the described embodiments only. Numerous modifications, changes, variations, substitutions and equivalents will be apparent to those skilled in the art without departing from the scope of the invention as described in the claims.

Further, unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. An apparatus for indoor pollination, comprising:
a first ultraviolet (UV) light source configured to emit pollination enhancing light;
an arthropod trap;
a second UV light source housed in the arthropod trap and configured to emit arthropod attracting light; and
a microprocessor configured to switch on or off the first and second UV light sources depending on pollination requirements.

2. The apparatus according to claim 1, wherein the first UV light source comprises a plurality of first UV light-emitting diodes (LEDs).

3. The apparatus according to claim 2, wherein the first UV LEDs are configured to emit the pollination enhancing light at a wavelength of between about 280 nm and about 400 nm.

4. The apparatus according to claim 3, wherein the wavelength of the pollination enhancing light emitted by the first UV LEDs is between about 315 nm and about 400 nm.

5. The apparatus according to claim 2, wherein the first UV LEDs are arranged in one or more of a plurality of rows and a staggered arrangement.

6. The apparatus according to claim 1, wherein the second UV light source comprises a plurality of second UV LEDs.

7. The apparatus according to claim 1, further comprising:
a real-time clock coupled to the microprocessor and configured to regulate switching of the first UV light source on and off by the microprocessor.

8. The apparatus according to claim 1, further comprising:
a plurality of sensors coupled to the microprocessor and configured to measure one or more of temperature, humidity and light intensity and to feed one or more of a temperature measurement, a humidity measurement and a light intensity measurement back to the microprocessor.

9. The apparatus according to claim 1, further comprising:
a plurality of cameras coupled to the microprocessor and configured to allow real-time viewing.

10. The apparatus according to claim 1, further comprising:
a volatile organic compound (VOC) sensor coupled to the microprocessor, wherein the microprocessor is configured to start or end a pollination cycle based on a volatile organic compound (VOC) level detected by the VOC sensor.

11. The apparatus according to claim 1, wherein the arthropod trap comprises one or more of an electrocution grid, an adhesive board and a suction device.

12. An indoor pollination system, comprising:
an enclosure;
a plurality of grow lights within the enclosure; and
the apparatus for indoor pollination according to any one of the preceding claims provided within the enclosure.

13. The indoor pollination system according to claim 12, further comprising:
a housing provided in the enclosure, wherein the housing is configured to hold a plurality of arthropods.

14. The indoor pollination system according to claim 13, wherein the housing comprises an arthropod breeding chamber.

15. The indoor pollination system according to claim 13, wherein the housing is provided in an opening of the enclosure and further comprises a drawer, wherein the drawer is arranged to receive a plurality of arthropods when in a first position and to release the arthropods when in a second position.

16. The indoor pollination system according to claim 13, further comprising:
a release motor coupled to the housing, wherein the release motor is configured to open a door of the housing to release the arthropods in response to a signal from the microprocessor.

17. The indoor pollination system according to claim 16, wherein the release motor is configured to release the arthropods in a cyclical or sequential manner.

18. The indoor pollination system according to claim 12, further comprising:
a sprayer within the enclosure, wherein the sprayer is configured to spray an olfactory enhancer onto crops.

19. A method for indoor pollination, comprising:
switching on a first ultraviolet (UV) light source configured to emit pollination enhancing light when pollination is required;
switching off the first UV light source when pollination is no longer required; and
switching on a second UV light source housed in an arthropod trap when pollination is no longer required, wherein the second UV light source is configured to emit arthropod attracting light for arthropod attraction.

20. The method for indoor pollination according to claim 19, wherein the second UV light source is switched on at a predetermined interval after the first UV light source is switched off.

21. The method for indoor pollination according to claim 19, further comprising:
   introducing a plurality of arthropods in pupal stage into an indoor facility; and
   allowing the arthropods to hatch into adults before switching on the first UV light source.

22. The method for indoor pollination according to claim 21, further comprising:
   capturing the adult arthropods in the arthropod trap after switching on the second UV light source.

* * * * *